United States Patent [19]

Richards

[11] 4,439,295
[45] Mar. 27, 1984

[54] CHLORINE GENERATING APPARATUS

[76] Inventor: Joseph M. Richards, 2819 E. 49th, Tulsa, Okla. 74105

[21] Appl. No.: 480,880

[22] Filed: Mar. 31, 1983

[51] Int. Cl.³ .................... C25B 15/02; C25B 15/08; C25B 9/00; C25B 1/26
[52] U.S. Cl. ................................. 204/229; 204/260; 204/266; 204/272; 204/128
[58] Field of Search ............... 204/260, 229, 272, 266, 204/278, 128

[56] References Cited

U.S. PATENT DOCUMENTS

| 4,248,715 | 2/1981 | Olivier | 204/260 |
| 4,260,468 | 4/1981 | Bradley | 204/260 |
| 4,290,873 | 9/1981 | Weaver | 204/260 X |
| 4,363,713 | 12/1982 | Bindon | 204/128 X |

Primary Examiner—Donald R. Valentine

Attorney, Agent, or Firm—Head, Johnson & Stevenson

[57] ABSTRACT

A chlorine generating apparatus for chlorine treating of a body of water and comprising a pair of concentrically arranged tanks having concentrically arranged access ports, the inner tank being a salt tank and having a perforated portion at the bottom thereof in communication with an anode chamber, and the annulus between the two tanks being a cathode chamber. A salt plug-gas trap assembly is removably secured to the concentric ports of the two tanks, the assembly having a chlorine tube extending therein which is open to the interior of the salt tank for receiving the generated chlorine therefrom and being independently open to the cathode chamber for receiving circulating water therefrom. The chlorine is mixed with the water in the gas trap and the chlorinated water is returned to the body of water being treated by the chlorine generating apparatus.

8 Claims, 3 Drawing Figures

CHLORINE GENERATING APPARATUS

BACKGROUND OF THE INVENTION

1. Field of the Invention:

This invention relates to improvements in chlorine generating apparatus and more particularly, but not by way of limitation, to a chlorine generator for chlorinating a body of water, such as a swimming pool.

2. Description of the Prior Art:

For many years the most common method of chlorinating a body of water, such as a swimming pool, has been by the use of dry hypochlorites or hypochlorite solutions. Another widespread method of chlorinating swimming pools involves the introduction of gaseous chlorine which is stored as liquid chlorine in containers under high pressure. Both of these chlorinating methods have certain disadvantages in that the owner or operator of the pool facility must check the condition of the water substantially daily and treatment of the water is accomplished manually.

In order to overcome these disadvantages an electrolytic chlorine generator was developed wherein the well known principle of electrolysis of a solution of a metallic chloride salt builds up its own internal pressure and discharges chlorine into a flowing stream, and as shown in my prior U.S. Pat. No. 3,563,879, issued Feb. 16, 1971, and entitled "Electrolytic Chlorine Generator." Devices or this type also have certain disadvantages, however, as for example, they usually require periodic draining for proper operation. In addition, refilling the salt tank of the generator is frequently unpleasant due to the release of dissolved chlorine gas. Also, undesirable mixing of the hydrogen gas produced in the electrolysis with the chlorine gas evolved in the salt tank may occur.

SUMMARY OF THE INVENTION

The present invention contemplates a novel chlorine generator apparatus which has been particularly designed and constructed for overcoming the foregoing disadvantages. The novel chlorine generator comprises concentrically arranged tanks constructed from a polyethylene, fiberglass, PVC (polyvinyl chloride), or other material which is substantially resistant to the action of wet gaseous chlorine and sodium hydroxide. The power supply is separate from the chlorinator unit and is adjustable to permit the operation of the chlorine generator at substantially any desired electrical current between the ranges of 0 and 80 amperes, contingent upon the required chlorine production from the unit. The quantity of chlorine produced is in accordance with Faraday's Law, i.e.: A current of one ampere for one second will liberate one gram equivalent weight of chlorine.

The inner tank is a salt tank and is provided with a perforated bottom portion open to the anode chamber and sealed from the cathode chamber. A quantity of salt and water is deposited in the salt tank whereby brine is delivered to the anode chamber through the perforated bottom of the tank. The electrolytic action in the anode chamber releases chlorine gas which is directed upwardly through the salt tank for discharge into a gas trap. The annular chamber between the salt tank and the outer tank is open to the body of water to be chlorinated through the usual water circulating pump, and as the water is directed into the cathode chamber and moves upwardly therethrough for discharge into the return conduit for return of the water to the pool, or other body of water, the moving or flowing water "picks up" or absorbs the chlorine gas present in the gas trap and delivers the chlorinated water into the body of water being treated by the unit. The novel chlorine generating apparatus is simple and efficient in operation and economical and durable in construction.

DETAILED DESCRIPTION OF THE PREFERRED EMBODIMENT

Figure 1:
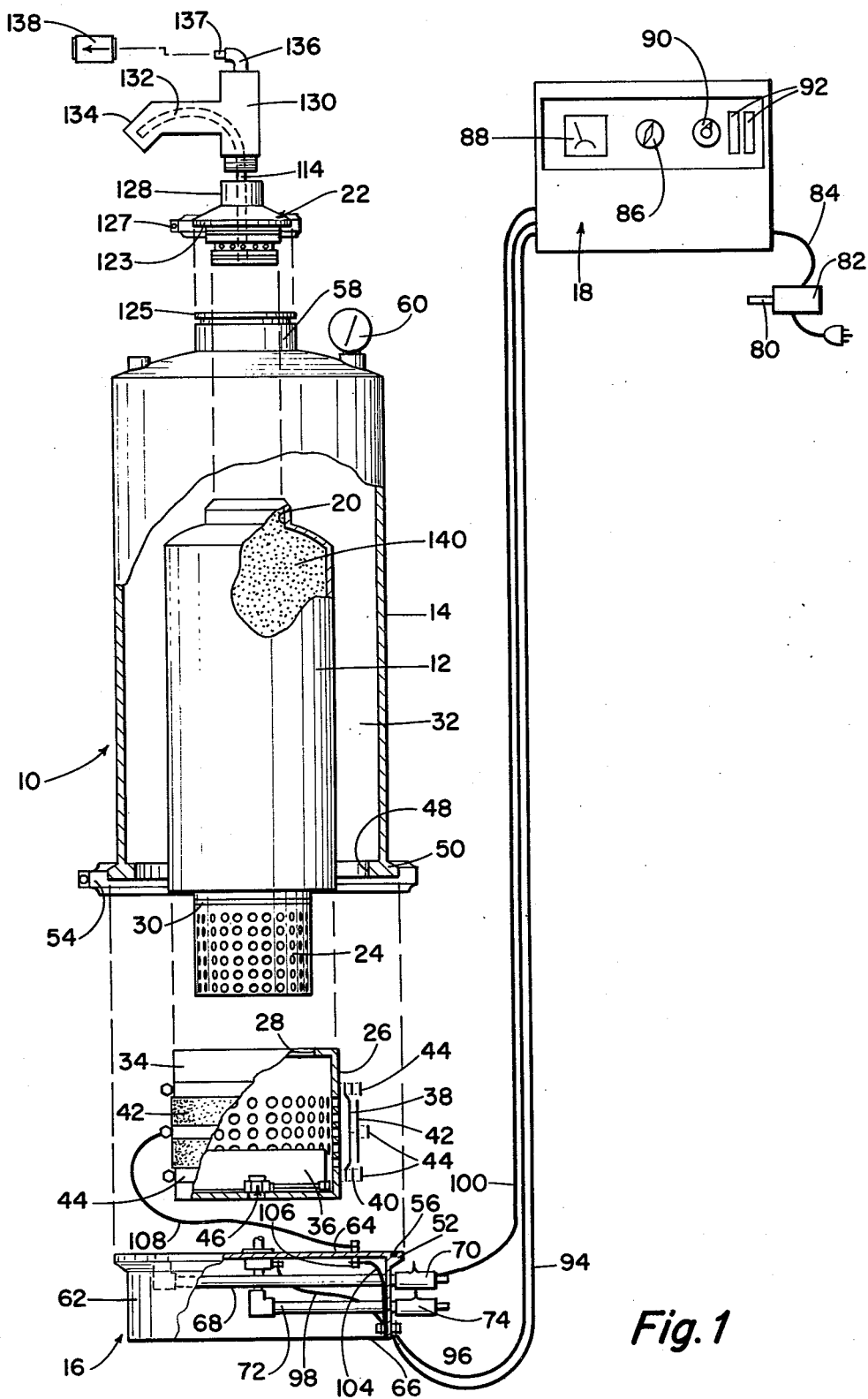
FIG. 1 is an exploded elevational view, partly in section, of a chlorine generating apparatus embodying the invention.

Referring to the drawings in detail, reference character 10 generally indicates a chlorine generating apparatus comprising a pair of concentrically arranged tanks 12 and 14, a base means 16 and a power supply means generally indicated at 18. The power means 18 may be suitably mounted or installed independently and separate from the tanks 12 and 14 and base means 16, and is preferably of an adjustable type which permits the operation of the chlorine generator 10 at substantially any desired electrical current ranging between zero and eighty amperes, contingent upon the required chlorine production. The amount of chlorine produced in the generator 10 is in accordance with Faraday's law, which states: A current of one ampere for one second will liberate one gram equivalent weight of chlorine.

The internal tank 12 is a salt tank and is open at one end 20 for engagement with a gas trap assembly indicated at 22 and for a purpose as will be hereinafter set forth. A perforated basket or cage means 24 is provided at the opposite end of the salt tank 12 and extends into an anode chamber 26 through an opening 28 provided in the chamber 26. Suitable sealing means, such as an O-ring 30 is interposed between the outer periphery of the cage means 24 and the bore or opening 28, with the O-ring 30 being disposed above the perforations of the cage 24 as shown in FIG. 1, thus preventing leakage between the anode chamber and the annulus 32 provided between the tanks 12 and 14. The annulus 32 is the cathode chamber for the unit 10.

The anode chamber 26 may be of any suitable type, and includes a housing 34 having an anode 36 disposed therein, and a membrane 38 secured around the outer periphery thereof by means of compression bands 40. In addition, a perforated cathode band 42 is disposed around the outer periphery of the membrane 38 and secured in position by means of suitable retainer straps 44. The anode 36 is preferably constructed from an expanded metal formed into a substantially circular configuration, but not limited thereto, and the anode chamber 26 is secured to the base means 16 by a suitable or well known anode connector assembly 46. The anode connector assembly 46 is of any suitable type, such as of a titanium construction and the connection thereof with the base means 16 is of a conventional type. The membrane 38 is preferably constructed from Nafion (a trademark of E. I. DuPont), and it is to be noted that the perforation of the lower portion of the salt tank 12 prevents direct contact of any undissolved salt with the inner surface of the membrane 38, which is used to separate the brine (anolyte) chamber from the catholyte chamber (the annular space 32). Direct contact between the Nafion material and undissolved salt may result in damage to the membrane. The outer surface of the membrane 28 is in intimate contact or engagement with the cathode screen 42. The cathode screen 42 is preferably constructed from brass, steel, or any other suitable conductive material which is resistant to attack by sodium hydroxide or water.

The outer housing or tank 14 is open at one end 48 thereof and is provided with an outwardly extending circumferential flange 50 extending therearound for disposition against a complementary circumferential flange 52 provided at one end of the base means 16. The base means 16 may be secured to the tank 14 in any suitable manner, such as by a V-band clamp means 54 secured between and around the abutting flanges 50 and 52. Of course, suitable sealing means, such as an O-ring 56 may be interposed between the flanges 50 and 52 for precluding leakage of fluid therebetween. The opposite or upper end of the tank 14 is provided with a port 58 for receiving the gas trap means 22 therein for a purpose as will be hereinafter set forth. In addition, a suitable pressure gauge means 60 is provided for the tank 14 and in communication with the interior thereof to provide a visual determination of the internal pressure of the unit 10, as required.

The base means 16 comprises a support means or housing 62 having one end thereof closed by a plate means 64 and the opposite end thereof open as shown at 66 to provide access to the interior thereof. A first conduit means 68 is suitably secured to a port (not shown) provided in the plate 64 for communication with the interior of the tank 14. A water supply valve means 70 is provided at the outer end of the conduit means 68, and the valve means 70 is connected with the pressure side of a suitable swimming pool circulating pump (not shown), or the like, for directing the pool water into the interior of the tank 14 as will be hereinafter set forth. A second conduit means 72 in communication with the interior of the anode chamber 26 is also provided in the housing 62 and a normally closed backwash-drain valve 74 is secured to the outer end of the conduit 72 and in connection with the pressure side of the pool circulating pump (not shown).

A third conduit means 76 is provided in the base means 16 and is in open communication with the internal pressure of the tank 14. A suitable compression fitting means 78 is secured to the outer end of the conduit means 76 for connection with a pressure switch line 80. The line 80 is operably connected with a suitable pressure switch 82 which is interposed in the power supply line 84 connecting the power supply 18 with a source of electrical current. The pressure switch 84 is responsive to the internal pressure of the tank 14 for interruption of the supply of electrical current to the power supply 18 when the pressure within the tank 14 falls below a preselected level.

The power supply 18 includes an on-off switch 86, an amp meter 88a rate control means 90 and reset means 92. A positive lead 94 from the power supply is connected with the base means 16 by a suitable electrical connector 96, and a positive cable 98 connects the connector 96 with the anode connector assembly 46. A negative lead 100 is connected with the base means 16 by a suitable electrical connector 102, and a negative cable 104 is connected between the electrical connector 102 and another electrical connector 106 which is secured to the plate 64. The connector 106 is in operable connection with the cathode 42 through a cathode connector line 108.

Figures 2, 3:
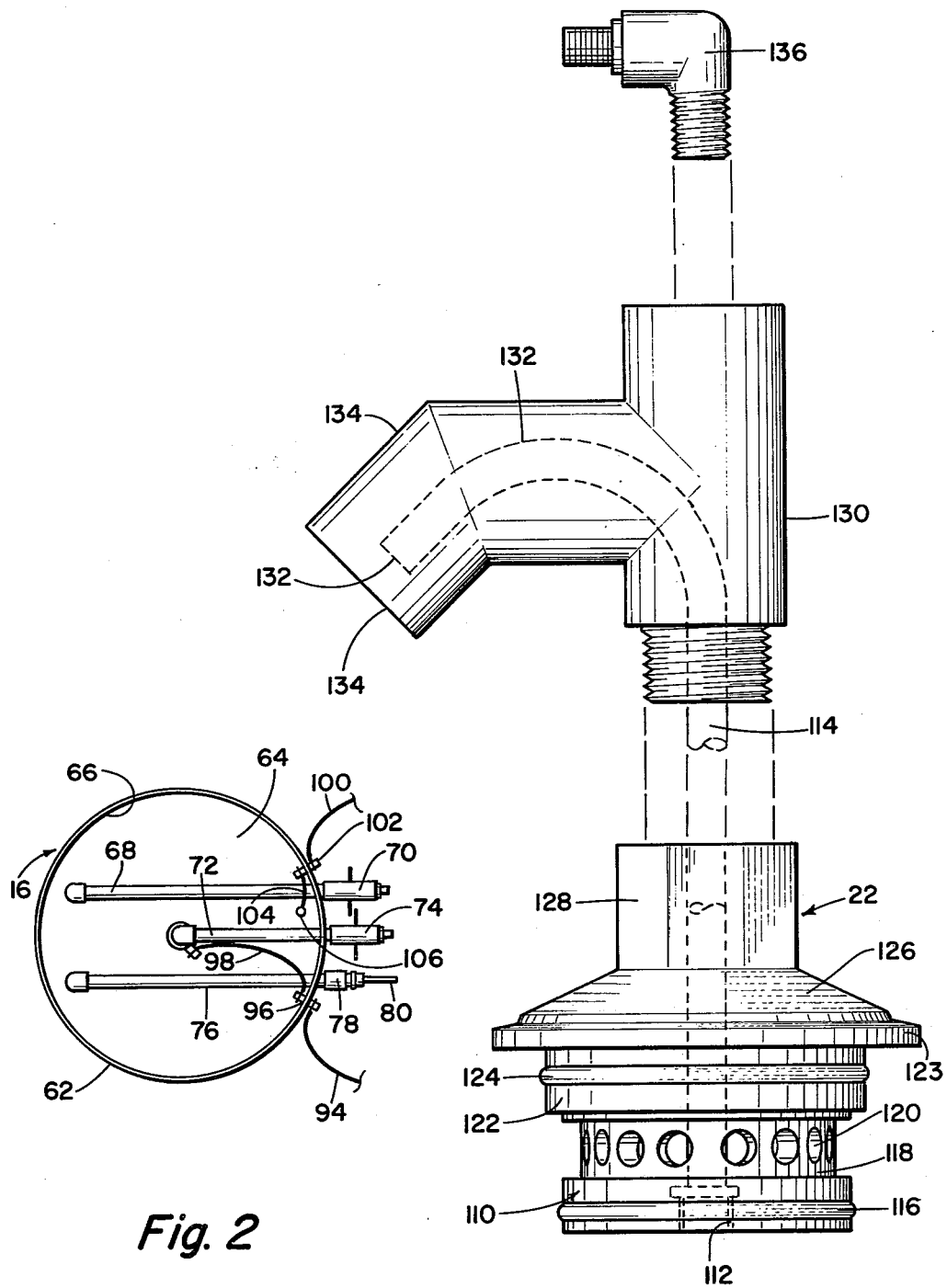
FIG. 2 is a bottom plan view of the chlorine generating apparatus shown in FIG. 1.
FIG. 3 is an enlarged elevational view of a salt cap assembly utilized in a chlorine generating apparatus embodying the invention, the portions shown in broken lines for purposes of illustration.

Referring now to FIG. 3, the gas trap 22 comprises a salt plug 110 having a centrally disposed bore 112 extending therethrough for communication with or for receiving one end of a chlorine tube 114 therein. The interior of the chlorine tube 114 is in open communication with the interior of the salt tank 12 for a purpose as will be hereinafter set forth. The outer diameter of the plug 110 is substantially equal to the inner diameter of the bore 20 of the tank 12 for a snug engagement therewith, and suitable sealing means, such as an O-ring 116 is interposed between the plug 110 and bore 20 for precluding leakage of fluid therebetween. A perforated sleeve 118 extends axially outwardly from the plug 110 and in the assembled orientation of the unit 10, the interior of the sleeve 118 is in communication with the interior of the tank 14 through the perforations 120 of the sleeve 118. The outer diameter of the sleeve 118 is enlarged at 122, outboard of the perforations 120, and is of an outer diameter substantially equal to the inner diameter of the bore 58 of the tank 14 for a snug engagement therewith. Suitable sealing means, such as an O-ring 124, is interposed between the enlarged diameter portion 122 and the bore 58 for precluding leakage of fluid therebetween. The conical portion 126 is preferably provided with an outwardly extending circumferential flange 123 around the outer periphery of the largest diameter portion thereof for abutting engagement with a complementary outwardly extending circumferential flange 125 provided at the outer end of the bore 58 of the tank 14. The flanges 123 and 125 may be secured together in any suitable manner, such as by a V-band clamp 127, or the like.

The sleeve 118 is preferably of a substantially conical configuration 126 outboard of the enlarged diameter portion 122 and terminates in a neck member 128. The neck member 128 is threadedly or otherwise secured to a mixing pipe or mixing Tee generally indicated at 130. The chlorine tube 114 extends axially into the interior of the mixing pipe 130, and the upper or outer end of the tube 114 is arcuate as shown at 132 and extends into the radially outwardly extending arm 134 of the mixing pipe 130. The outer end 132 of the tube 114 is open to the interior of the mixing pipe 130, and the outer end 134 of the pipe 130 is closed. The upper or outer end of the pipe 130 is provided with a threaded bore (not shown) for receiving one end of a street ell 136, or the like therein, which is in communication with the interior of the pipe 130 and a suitable one way check valve means 138 (FIG. 1). The valve means 138 is in communication or connection with a return conduit or passageway to the pool or body of water being treated by the unit 10.

In use, a suitable salt, such as sodium chloride in the form of rock salt 140 is loaded into the salt tank 12 through the port or opening 20 of the tank 12 prior to insertion or installation of the salt plug 110 therein. The tank 12 may then be filled with water in any suitable manner, such as by adding water through the port 20, or by opening the backflow or drain valve 74 for admitting water through the bottom of the tank 12. The tank 14 is then filled with water through the port 58, and it is to be noted that the ports 20 and 58 are concentrically arranged. The ports 20 and 58 are then closed by inserting the salt plug 110 in the port 20 and the enlarged diameter portion 122 into the bore 58. This places the interior of the salt tank 12 in open communication with the tube 114 and seals off any communication between the interior of the tank 12 and the annulus 32. Simultaneously, the annulus 32 is placed in communication with the interior of the mixing pipe 130 through the ports or apertures 120 of the sleeve 118.

The clamp means 127 may be utilized for securely clamping the gas trap assembly 22 in position on the tanks 12 and 14. The valve 70 is then operably connected with the pressure side of the usual pool circulating pump (not shown). The normally closed valve 74 is also operably connected with the pressure side of the circulating pump, and the outlet end 137 of the street ell 136 is operably connected with the usual pool return line (not shown) through the one-way check valve means 138. The pressure switch means 82 is then operably connected with the pressure switch line 80 in the usual or well known manner.

In order to place the unit 10 in operation, the pool circulating pump (not shown) may be turned on or activated in the usual or well known manner to establish proper water circulation from the pool (not shown), through the unit 10, and back to the pool through the water return line (not shown). The water supply valve 70 may then be opened for admitting water into the interior of the tank 14 for flowing upwardly through the catholyte chamber 32. Normal operating pressure due to the pool water circulating pump closes the pressure switch 82, thus supplying electric current to the power supply 18 for permitting operation thereof. In the absence of water circulation pressure, no electrical current can flow in the generator 10 since the power supply is operable due to the open condition of the pressure switch 82 in this low pressure condition within the tank 14. The backwash or drain valve 74 is normally closed for all operation of the unit 10, except when it is desired to drain or backwash the unit prior to filling of the tank 12 with salt, or when it is desired to add water to the tank 12 through the bottom thereof, as hereinbefore set forth.

The power supply 18 may be turned on by means of the on-off switch 86 when the foregoing conditions have been met, and the desired chlorine generating rate may be set by the rate control means 90 as is well known. The chlorine is evolved in the anode chamber 26 and the resultant chlorine moves upwardly through the perforated cage or basket 24 and through the tank 12. The chlorine gas is directed through the tube 114 and is discharged through the open end 132 thereof for collection thereon in the mixing pipe 130 of the gas trap assembly 22. The gas being released from the tank 12 through the open end 132 of the tube 114 substantially precludes any percolating action in the tank 12. This substantially eliminates any loss of brine through the chlorine tube 114 which might occur if the tube 114 were not of a design whereby the chlorine gas is discharged away from and downwardly with respect to the longitudinal axis of the tube 114.

The chlorine gas thus released in the mixing pipe 130 is mixed with the water entering the pipe 130 from the tank 14 through the perforations 120 of the sleeve 118. The chlorine is dissolved in the water as it is returned to the pool or other body of water from the mixing pipe 130, through the ell 136 and valve 138 and through the water return line (not shown).

The water entering the tank 14 through the valve 70 and conduit 68 moves upwardly through the cathode chamber 32, as hereinbefore set forth, and serves to cool the cathode electrode 42 and the anode chamber 26 in addition to removing from the cathode chamber 32 any sodium hydroxide which may be created by the electrolysis of the sodium chloride.

Whereas most present day electrolytic chlorine generators require periodic draining for proper operation, the construction and operation of the chlorine generating apparatus 10 eliminates the need for draining of the unit to maintain efficient chlorine production. Of course, the automatic return of the sodium hydroxide to the pool with the chlorinated return water substantially prevents the pH of the pool water from becoming acid. In addition, the refilling of the salt tank of most present day electrolytic chlorine generating apparatus is frequently unpleasant due to the release of dissolved chlorine gas. In the construction and operation of the unit 10, the salt tank 12 is purged of substantially all dissolved chlorine by opening the backwash valve 74 for a time period of approximately five minutes prior to a re-salting operation. Chlorine free brine may then be drained by switching the backwash-drain hose 72 to the draining position therefor.

It has been found that the use of the Nafion membrane, as hereinbefore set forth, in combination with a dimensionally stable anode produced by the Diamond Shamrock Corporation results in a highly efficient generator. The usual D.S.A (dimensionally stable anode) is constructed from an expanded titanium metal substrate coated with precious metal oxides, such as platinum. It is to be noted, however, that there is no intention of limiting the construction of the membrane and anode to these particular specifications. Other materials may be utilized such as a graphite anode, an asbestos diaphragm or porous porcelain pot diaphragm or other materials known to those skilled in the art.

The mixing of the sodium hydroxide from the cathode with the chlorine in the gas trap assembly 22 results in the formation of a sodium hypochlorite solution having excellent germicidal and algaecidal properties for the pool water. In addition, the brine in the anode chamber 26 is always in a saturated condition since the undissolved salt is stored above the level of the anode and membrane or diaphragm. This results in a maximum efficiency of operation for the unit 10 as well as a protection of the anode by the prevention of oxygen released due to unsaturated brine.

The pressure gauge 60 functions to provide a visible indication of any condition of flow restriction due to line clogging by indicating any abnormally increasing pressure when compared to the normal pool water circulating conditions. If desired, the gauge 60 may be operably connected to a pressure switch (not shown) which is set to turn off the power supply 18 in the event of any abnormal pressures due to a blocked return flow.

From the foregoing it will be apparent that the present invention provides a novel chlorine generating apparatus comprising two concentrically arranged tanks having concentrically arranged access ports whereby salt and water may be loaded into the interior tank and water may be loaded into the annulus between the two tanks. The ports of each tank may be closed in a manner for sealing off communication between the tanks. An anode chamber is in open communication with the salt tank for receiving brine therefrom, and the water of the pool or other body of water being treated by the unit is circulated from the pool, through the operating unit, and returned to the pool. The circulating water flows through the cathode chamber and is discharged into a mixing pipe or mixing chamber. The chlorine gas released in the salt tank by the electrolytic action between the anode and cathode chambers is released into the mixing chamber for mixing with the water from the cathode chamber. The chlorine is dissolved in the water, and the chlorinated water is returned to the pool or other body of water. Pressure switch means is provided for precluding operation of the unit under low internal pressure conditions, and sodium hydroxide is removed from the cathode chamber by the circulating water for return to the pool for reducing the pH of the water in the pool and providing germicidal benefits for the pool water.

Whereas the present invention has been described in particular relation to the drawings attached hereto, it should be understood that other and further modifications, apart from those shown or suggested herein, may be made within the spirit and scope of this invention.

What is claimed is:

1. A chlorine generating apparatus for chlorination of a body of water, the chlorine generating apparatus comprising a pair of concentrically arranged inner and outer tanks having concentrically arranged ports providing independent access to the interior of each tank, the inner tank being a salt tank, anode chamber means, disposed below said salt tank and in communication therewith, perforated means providing said communication between the interior of the salt tank and the anode chamber means, an annulus provided between the anode chamber means and outer tanks forming a cathode chamber, gas trap assembly means removably engagable simultaneously with the concentrically arranged ports and having the interior thereof independently in communication with the interior of the salt tank and cathode chamber, chlorine tube means extending into the gas trap assembly means to provide said communication between the interior of the salt tank and the interior of the gas trap assembly means whereby chlorine evolved in the anode chamber is discharged into the gas trap assembly, fluid inlet means provided for admitting water from the body of water into the cathode chamber for movement upwardly therethrough and into the interior of the gas trap assembly means whereby the chlorine discharged into the gas trap assembly means is mixed with the water, and water discharge means provided for the gas trap assembly means for discharge of the chlorine water mixture therefrom for return to the body of water.

2. A chlorine generating apparatus as set forth in claim 1 and including remote power supply means operably connected with the anode chamber means and cathode chamber for activation thereof to produce chlorine in the anode chamber.

3. A chlorine generating apparatus as set forth in claim 2 and including pressure switch means operably connected between the power supply means and the interior of at least one of the tanks for controlling the supply of electric current to the power supply means in accordance with the internal pressure conditions of the said one tank.

4. A chlorine generating apparatus as set forth in claim 1 wherein the chlorine tube means comprises an elongated tube member having one end open to the interior of the salt tank and having the opposite end of an arcuate configuration and open at the outer end to the interior of the gas trap assembly for discharging the chlorine therein in a manner substantially precluding the percolating of the brine solution from the salt tank.

5. A chlorine generating apparatus as set forth in claim 1 wherein the perforated means comprises a perforated cage means disposed at the lower end of the salt tank and in communication with the interior of the anode chamber means, and including sealing means interposed between the perforated cage means and the anode chamber means for precluding leakage of fluid from the anode chamber means and perforated cage means into the cathode chamber.

6. A chlorine generating apparatus as set forth in claim 1 wherein the anodechamber means comprises a housing member, an anode member disposed within the housing, membrane means secured around the outer periphery of the housing, and means operably connecting the anode member with a source of power.

7. A chlorine generating apparatus as set forth in claim 6 and including cathode means secured around the outer periphery of the membrane means and open to the cathode chamber, and means operably connecting the cathode member with the source of power.

8. A chlorine generating apparatus as set forth in claim 1 and including check valve means in communication with the water discharge means for precluding flow of the discharged water back into the gas trap assembly means.

* * * * *